US011822855B2

(12) United States Patent
Kim et al.

(10) Patent No.: US 11,822,855 B2
(45) Date of Patent: *Nov. 21, 2023

(54) ELECTRONIC DEVICE, CONTROL METHOD THEREOF, AND SOUND OUTPUT CONTROL SYSTEM OF THE ELECTRONIC DEVICE

(71) Applicant: SAMSUNG ELECTRONICS CO., LTD., Suwon-si (KR)

(72) Inventors: Jung Su Kim, Suwon-si (KR); Ho Jin Eo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/517,746

(22) Filed: Nov. 3, 2021

(65) Prior Publication Data
US 2022/0057986 A1  Feb. 24, 2022

Related U.S. Application Data

(63) Continuation of application No. 16/655,566, filed on Oct. 17, 2019, now Pat. No. 11,188,290.

(30) Foreign Application Priority Data

Oct. 17, 2018 (KR) .................. 10-2018-0123698

(51) Int. Cl.
G06F 3/16 (2006.01)
H04W 4/80 (2018.01)
G05B 15/02 (2006.01)

(52) U.S. Cl.
CPC ............ *G06F 3/165* (2013.01); *G05B 15/02* (2013.01); *G06F 3/167* (2013.01); *H04W 4/80* (2018.02)

(58) Field of Classification Search
None
See application file for complete search history.

(56) References Cited

U.S. PATENT DOCUMENTS 9,401,149 B2   7/2016   Bae et al.
9,530,418 B2   12/2016  Bae et al.
(Continued)

FOREIGN PATENT DOCUMENTS

JP   2012-173325    9/2012
KR   10-2008-0098711   11/2008
(Continued)

OTHER PUBLICATIONS

India Office Action dated Feb. 10, 2022 for IN Application No. 202117017063.
(Continued)

*Primary Examiner* — Hemant S Patel
(74) *Attorney, Agent, or Firm* — Nixon & Vanderhye P.C.

(57) ABSTRACT

Provided are an electronic device, a control method thereof, and a sound output control system of the electronic device, for example, a technique for controlling sound that is output from an electronic device located in the same space as a voice recognition device. The electronic device according to an embodiment of the disclosure includes: a communication device comprising communication circuitry configured to detect a voice recognition device within a specified distance of the electronic device; a storage device comprising a memory configured to store identification information of the detected voice recognition device; and a controller configured to compare, based on the communication device receiving identification information from a server of a voice recognition device that has received a voice command from a user, the received identification information with the identification information stored in the storage device, and to control, based on the controller determining that the
(Continued)

received identification information is identical to the stored identification information, the electronic device to stop outputting sound.

19 Claims, 10 Drawing Sheets

(56) References Cited

U.S. PATENT DOCUMENTS

| | | |
|---|---|---|
| 9,582,245 B2 | 2/2017 | Kim et al. |
| 11,188,290 B2* | 11/2021 | Kim .................. G05B 15/02 |
| 2012/0245932 A1 | 9/2012 | Ouchi |
| 2013/0100268 A1 | 4/2013 | Mihailidis |
| 2014/0242913 A1* | 8/2014 | Pang .................. H04L 67/025 |
| | | 455/41.3 |
| 2016/0381201 A1 | 12/2016 | Park et al. |
| 2017/0047066 A1 | 2/2017 | Liu |
| 2017/0053650 A1* | 2/2017 | Ogawa .................. G10L 25/51 |
| 2017/0236512 A1 | 8/2017 | Williams et al. |
| 2018/0277112 A1* | 9/2018 | Kim .................. G06F 3/167 |

FOREIGN PATENT DOCUMENTS

| | | |
|---|---|---|
| KR | 10-1874946 | 7/2018 |
| KR | 10-2018-0112325 | 10/2018 |

OTHER PUBLICATIONS

U.S. Appl. No. 16/655,566, filed Oct. 17, 2019; Kim et al.
Search Report dated Feb. 19, 2020 in counterpart International Patent Application No. PCT/KR2019/013652.
Extended Search Report and Written Opinion dated Mar. 13, 2020 in counterpart European Patent Application No. 19203855.2.
European Office Action dated Jun. 15, 2021 for EP Application No. 19203855.2.
Summons to Oral Proceedings dated Dec. 2, 2022 for EP Application No. 19203855.2.
Letter of Reply from Applicant re EP Application No. 19203855.2.
EPO Rule 71(3) dated Jun. 27, 2023 for EP Application No. 19203855.2.

* cited by examiner

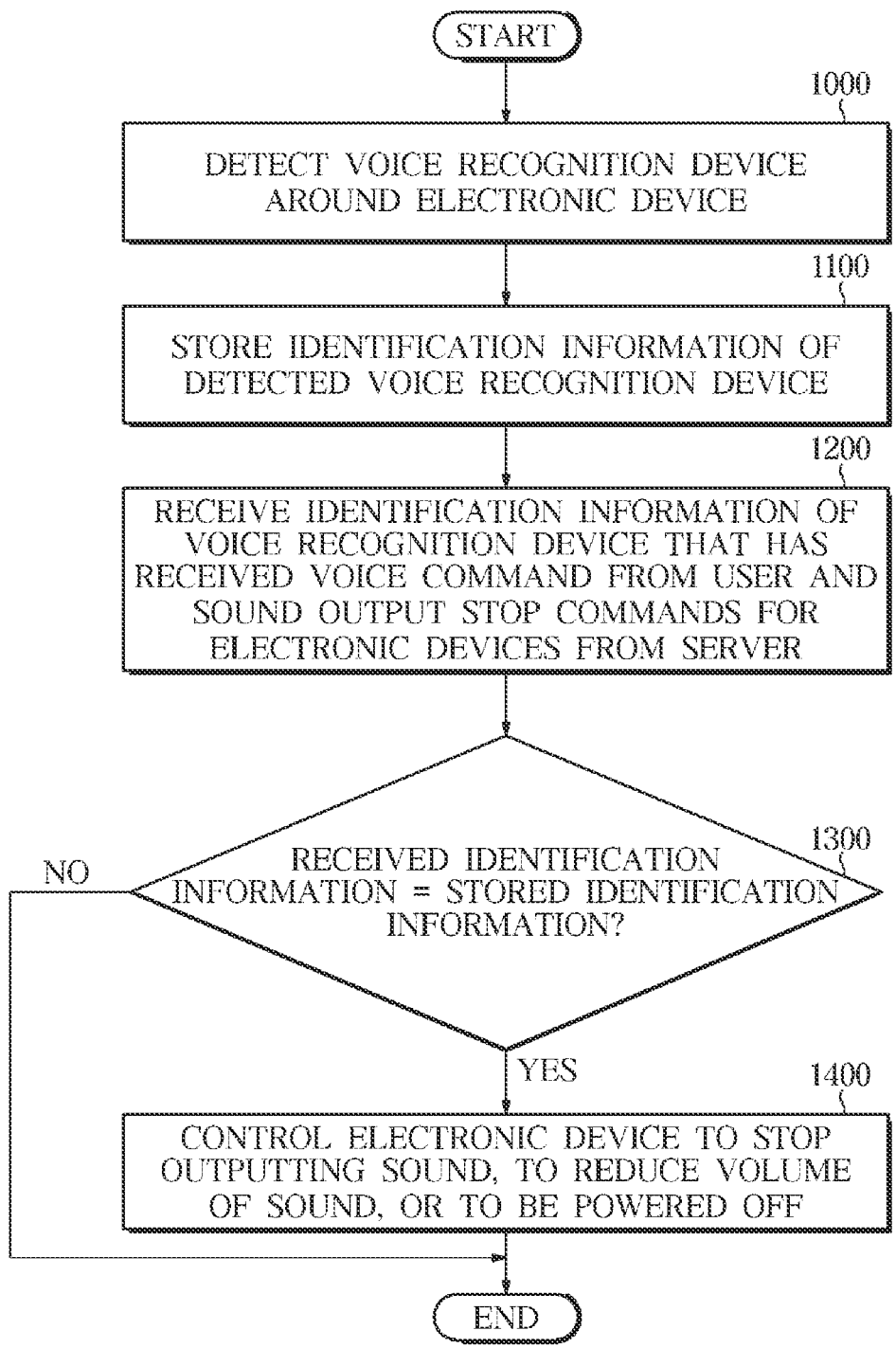

ELECTRONIC DEVICE, CONTROL METHOD THEREOF, AND SOUND OUTPUT CONTROL SYSTEM OF THE ELECTRONIC DEVICE

CROSS-REFERENCE TO RELATED APPLICATION

This application is a Continuation of U.S. application Ser. No. 16/655,566, filed Oct. 17, 2019, which claims priority to KR 10-2018-0123698, filed Oct. 17, 2018, the entire contents of which are all hereby incorporated herein by reference in their entireties.

BACKGROUND

1. Field

The disclosure relates to an electronic device, a control method thereof, and a sound output control system of the electronic device, and for example, to a technique for controlling sound output from an electronic device located in the same space as a voice recognition device.

2. Description of Related Art

According to developments of networks and multimedia reproducing technologies, many users are using a plurality of electronic devices in one space. The electronic devices include a multimedia reproducing device implemented based on the Internet, an audio system or a speaker having an audio output function, etc.

Also, due to a development of Artificial Intelligence (AI), use of voice recognition devices capable of recognizing a human's voice command is also increasing. Accordingly, studies into AI systems based on a machine learning algorithm and applications thereof are actively being conducted.

When a voice command is input through a voice recognition device, sound or noise output from another electronic device located around the voice recognition device may exist. In this case, a voice command recognition rate of the voice recognition device is reduced.

Accordingly, lately, there is an increasing concern on the technology for reducing or muting sound output from another electronic device located around a voice recognition device when a user inputs a voice command through the voice recognition device to increase a voice recognition rate. Furthermore, studies into technology for selectively limiting sound output from an electronic device located in the same space as a voice recognition device and another electronic device located in a different space from the voice recognition device are being conducted.

SUMMARY

Embodiments of the disclosure provide a technique for selectively controlling sound output from an electronic device located in the same space as a voice recognition device and another electronic device located in a different space from the voice recognition device based on a location of the voice recognition device.

Additional aspects of the disclosure will be set forth in part in the description which follows and, in part, will be apparent from the description.

According to an example aspect of the disclosure, an electronic device includes: a communication device comprising communication circuitry configured to detect a voice recognition device within a specified distance range of the electronic device; a storage device comprising a memory configured to store identification information of the detected voice recognition device; and a controller configured to: compare, based on the communication device receiving identification information of a voice recognition device that has received a voice command from a user, the received identification information and the identification information stored in the storage device, and to control, based on the controller determining that the received identification information is identical to the stored identification information, the electronic device to stop outputting sound or reduce a volume of the sound being output.

The communication device may receive a sound output stop command for the electronic device from the server, and when the communication device receives the identification information of the voice recognition device that has received the voice command and the sound output stop command for the electronic device from the server, the controller may compare the received identification information with the identification information stored in the storage device.

When the controller determines that the received identification information is identical to the stored identification information, the controller may reduce a volume of sound being output from the electronic device to a predetermined volume.

When the controller determines that the received identification information is identical to the stored identification information, the controller may power off the electronic device.

When the controller determines that the received identification information is not identical to the stored identification information, the controller may control the electronic device to keep outputting sound.

The communication device may include a Bluetooth Low Energy (BLE) module comprising BLE circuitry and may be configured to detect a voice recognition device located within a predetermined distance from the electronic device through short-range communication of the BLE module.

The identification information of the voice recognition device stored in the storage device may include a Media Access Control (MAC) address assigned to a network when the voice recognition device accesses the server.

According to another example aspect of the disclosure, a method of controlling an electronic device includes: detecting a voice recognition device within a specified distance range of the electronic device; storing identification information of the detected voice recognition device; receiving, from a server, identification information of a voice recognition device that has received a voice command from a user; and comparing the received identification information with the stored identification information and controlling, based on determining that the received identification information is identical to the stored identification information, the electronic device to stop outputting sound or reduce a volume of the sound being output.

The method may further include receiving a sound output stop command for the electronic device from the server, wherein, when the identification information of the voice recognition device that has received the voice command and the sound output stop command for the electronic device are received from the server, the received identification information may be compared with the stored identification information.

The method may further include, when it is determined that the received identification information is identical to the stored identification information, reducing a volume of sound being output from the electronic device to a predetermined volume.

The method may further include, when it is determined that the received identification information is identical to the stored identification information, powering off the electronic device.

The method may further include, when it is determined that the received identification information is not identical to the stored identification information, controlling the electronic device to keep outputting sound.

The detecting of the voice recognition device around the electronic device may include detecting a voice recognition device located within a predetermined distance from the electronic device through short-range communication of a Bluetooth Low Energy (BLE) module.

According to another example aspect of the disclosure, a sound output control system of an electronic device includes: a voice recognition device comprising voice recognition circuitry configured to receive a voice command from a user; a server configured to transmit identification information of a voice recognition device that has received a voice command to the electronic device; and an electronic device configured to detect a voice recognition device within a specified distance range of the electronic device, to store identification information of the detected voice recognition device, to compare, based on the identification information of the voice recognition device that has received the voice command being received from the server, the received identification information with the stored identification information, and to stop outputting sound or reduce a volume of the sound being output based on determining that the received identification information is identical to the stored identification information.

The server may transmit a sound output stop command for the electronic device to the electronic device, and when the electronic device receives the identification information of the voice recognition device that has received the voice command and the sound output stop command for the electronic device from the server, the electronic device may compare the received identification information with the stored identification information.

When it is determined that the identification information received from the server is identical to the stored identification information, the electronic device may reduce a volume of sound being output to a predetermined volume.

When it is determined that the identification information received from the server is identical to the stored identification information, the electronic device may be powered off.

When it is determined that the identification information received from the server is not identical to the stored identification information, the electronic device may keep outputting sound.

The electronic device may include a Bluetooth Low Energy (BLE) module comprising BLE circuitry, and detect a voice recognition device located within a predetermined distance from the electronic device through short-range communication of the BLE module.

BRIEF DESCRIPTION OF THE DRAWINGS

These and other aspects, features and advantages of certain embodiments of the present disclosure will be more apparent from the following detailed description, taken in conjunction with the accompanying drawings, in which:

FIG. 10 is a flowchart illustrating an example method of controlling an electronic device according to an embodiment of the disclosure.

DETAILED DESCRIPTION

Figure 1:
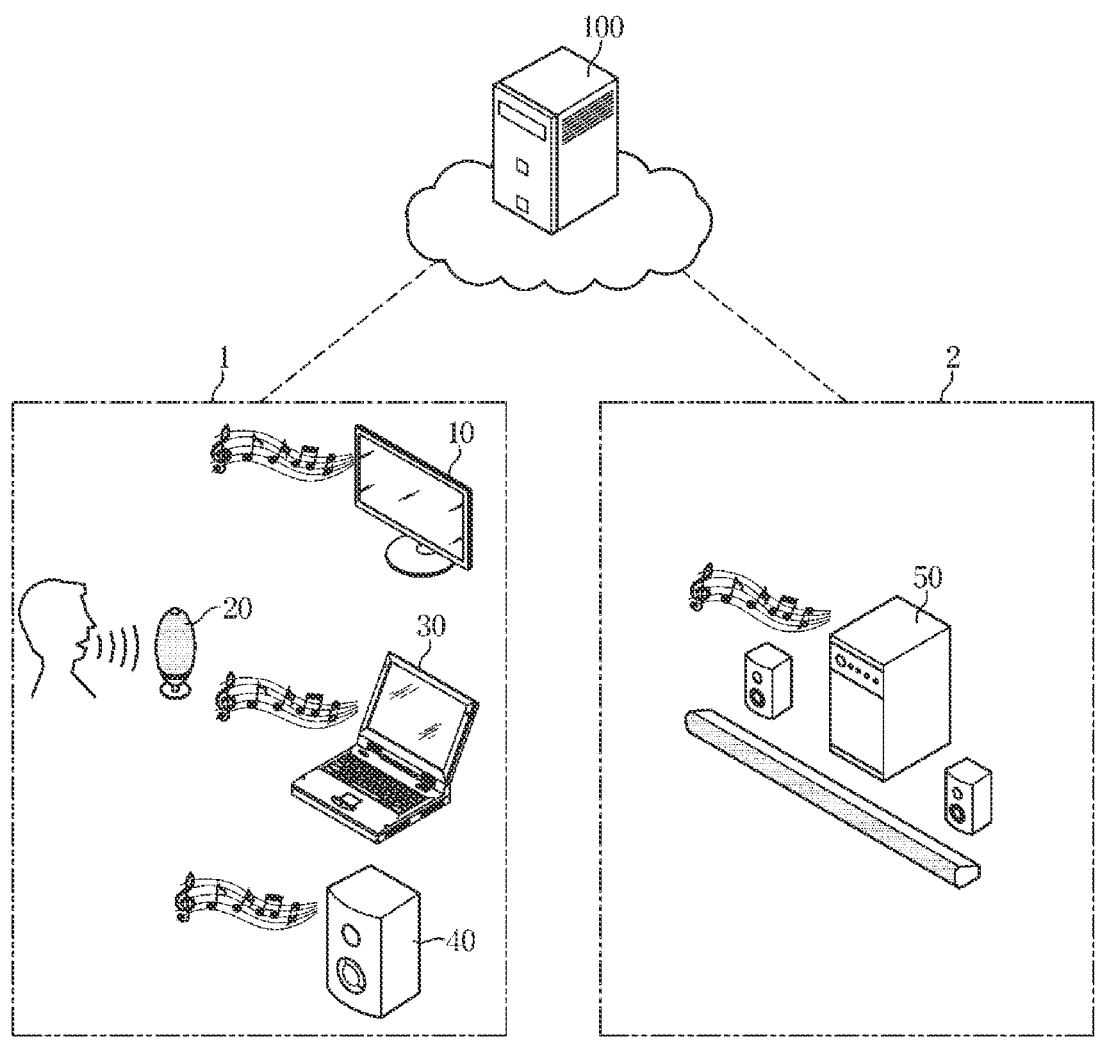
FIG. 1 is a diagram illustrating an example sound output control system of an electronic device according to an embodiment of the disclosure.

Hereinafter, like reference numerals will refer to like components throughout this disclosure. This disclosure may not describe all components of the various example embodiments, and general information in the technical field to which the disclosure belongs or overlapping information between the embodiments may not be described. As used herein, the terms "portion", "part, "module, "member" or "block" may be implemented as software, hardware, or any combination thereof, and according to embodiments, a plurality of "portions", "parts, "modules, "members" or "blocks" may be implemented as a single component, or a single "portion", "part, "module, "member" or "block" may include a plurality of components.

It will be understood that when a certain part is referred to as being "connected" to another part, it may be directly or indirectly connected to the other part. When a part is indirectly connected to another part, it may, for example, and without limitation, be connected to the other part through a wireless communication network.

It will be understood that when the terms "includes," "comprises," "including," and/or "comprising," when used in this disclosure, specify the presence of a stated component, but do not preclude the presence or addition of one or more other components.

The terms "first" and "second", as used herein, are used for the purposes of identification and do not imply any order of importance.

It is to be understood that the singular forms "a," "an," and "the" include plural referents unless the context clearly dictates otherwise.

Reference numerals used in operations are provided for convenience of description, without describing the order of the operations, and the operations may be executed in a different order from the stated order unless a specific order is definitely specified in the context.

Hereinafter, an operation principle and various example embodiments of the present disclosure will be described in greater detail below with reference to the accompanying drawings.

Figure 2:
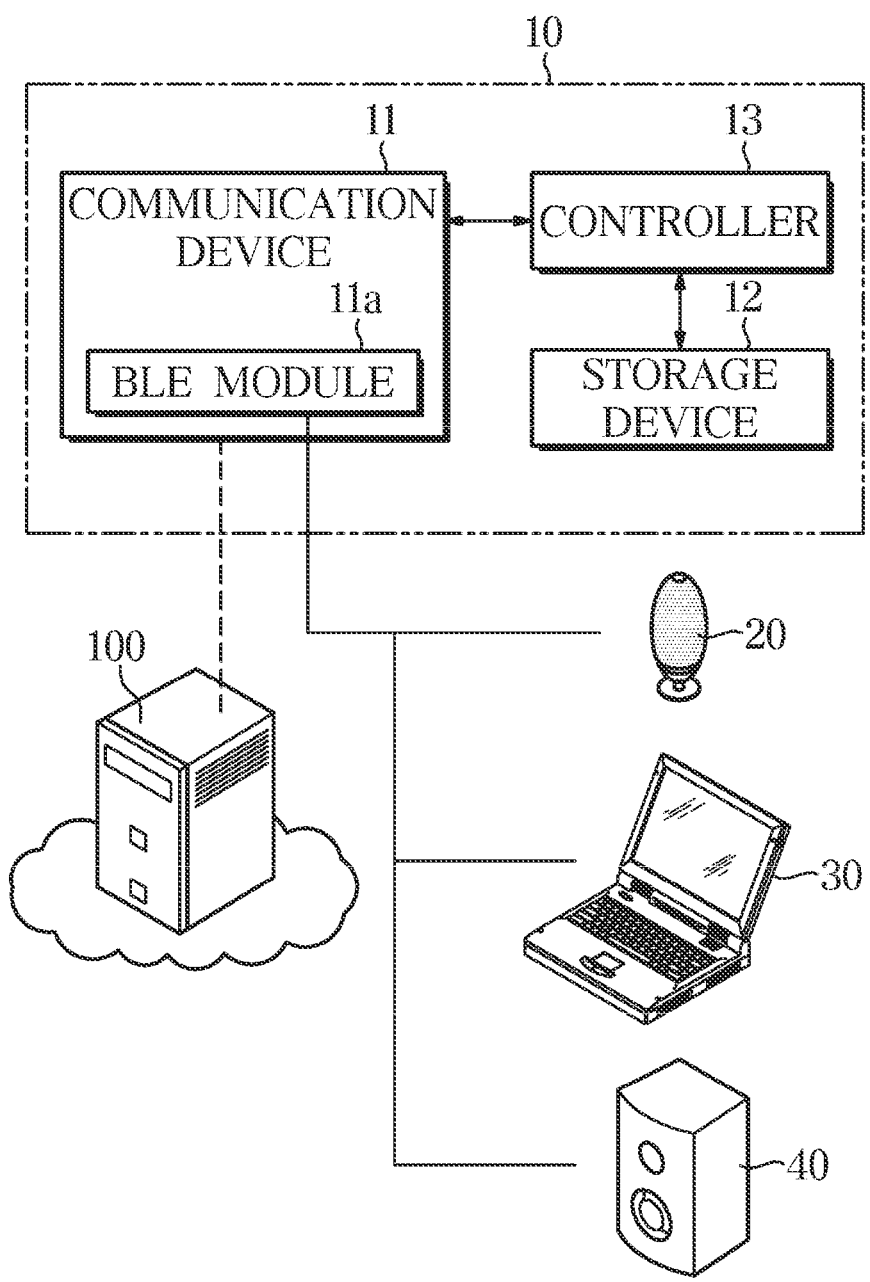
FIG. 2 is a block diagram illustrating an example electronic device according to an embodiment of the disclosure.

FIG. 1 is a diagram illustrating an example sound output control system of an electronic device according to an embodiment of the disclosure, and FIG. 2 is a block diagram illustrating an example electronic device according to an embodiment of the disclosure.

Referring to FIG. 1, according to developments of networks and multimedia reproducing technologies, many users may be using a plurality of electronic devices in a given space. The electronic devices may include, for example, and without limitation, a multimedia reproducing device implemented based on the Internet, an audio system, a speaker having an audio output function, etc.

As shown in FIG. 1, a plurality of electronic devices 10, 20, 30, 40, and 50 may be located in a plurality of spaces. For example, in a first region 1, a TV 10, a voice recognition device 20, a computer 30, and an audio system 40 may be located, and in a second region 2, a multimedia device such as a sound bar 50 may be located.

The electronic devices may include a multimedia reproducing device that outputs sound or a device that outputs no sound. The electronic devices may be connected to a server 100 through, for example, an Internet network, and share their operation information and control data with each other through the server 100.

A voice recognition device 20 such as an Artificial Intelligence (AI) speaker for recognizing a human's voice command to execute content of the command is widely used. The voice recognition device 20 may also communicate with the server 100 through a network, the server 100 may control other electronic devices based on a voice command recognized by the voice recognition device 20, and the voice recognition device 20 may execute content of the voice command.

For example, a user may input a voice command for acquiring weather information through the voice recognition device 20. In this example, the voice recognition device 20 may transmit content of the voice command to the server 100 in response to the received voice command. Thereafter, the voice recognition device 20 may receive information about weather from the server 100 and output the information about weather, thereby providing the user with weather information.

The user may input a voice command for playing music through the voice recognition device 20. In this example, the voice recognition device 20 may transmit content of the voice command to the server 100 in response to the received voice command. Thereafter, the voice recognition device 20 may receive music content from the server 100 and output the music content, thereby providing the user with music.

Further, the user may input a command for controlling an electronic device through the voice recognition device 20. In this example, the electronic device connected to the voice recognition device 20 through the server 100 may operate in response to the user's voice command. For example, the user may input a wake up command for an electronic device through the voice recognition device 20, and the voice recognition device 20 may transmit the wake up command for the electronic device to the server 100 in response to the received voice command.

The server 100 may transmit the wake up command to the electronic device connected to the server 100 in response to the user's voice command received through the voice recognition device 20. The electronic device may receive the wake up command from the server 100, and operate in response to the wake up command. For example, when the electronic device is in a power-off state, the electronic device may be powered on according to the wake up command received from the user through the voice recognition device 20.

The voice recognition device 20 may, for example, be a speaker in which a voice inputter (e.g., including voice input circuitry) such as a microphone capable of recognizing voice commands is installed. The voice recognition device 20 may be a mobile device such as a smart phone capable of recognizing voice commands. For example, the voice recognition device 20 according to an embodiment of the disclosure may be not limited in view of type and shape, and may be any device capable of receiving voice commands.

In an example in which, when a user inputs a voice command through the voice recognition device 20, sound is output from electronic devices located in the same space as the voice recognition device 20. In this example, a voice recognition rate of the voice recognition device 20 may be reduced. For example, a voice or sound output from an electronic device corresponding to a multimedia reproducing device may act as noise so that a voice command recognition rate of the voice recognition device 20 may be reduced.

To prevent and/or reduce deterioration in voice recognition rate of the voice recognition device 20, the server 100 connected to the electronic devices on a network may transmit, when a user's voice command is input to the voice recognition device 20, sound output stop commands to electronic devices outputting sound.

For example, as shown in FIG. 1, when a user inputs a voice command through the voice recognition device 20, and the server 100 determines that the voice command has been input, the server 100 may transmit sound output stop commands to the electronic devices (e.g., the TV 10, the computer 30, and the audio system 40) located in the first region 1, and likewise, the server 100 may transmit a sound output stop command to the electronic device (e.g., the sound bar 50) located in the second region 2.

The electronic devices 10, 30, 40 and 50 located in the first region 1 and the second region 2 may receive the sound output stop commands from the server 100 to stop outputting sound, to reduce volumes of sound, or to be powered off, thereby preventing and/or reducing the generation of noise that may deteriorate the voice recognition rate of the voice recognition device 20.

As shown in FIG. 1, when the voice recognition device 20 is located in the first region 1, sound output from the sound bar 50 located in the second region 2 may not influence the voice recognition rate of the voice recognition device 20. Nevertheless, the sound bar 50 may also stop outputting sound according to the sound output stop command received from the server 100.

For example, as described above, the server 100 may be connected to a plurality of electronic devices through a network, and the electronic devices may share operation information and control data with each other through the server 100. Therefore, the server 100 may transmit the sound output stop commands at once to the plurality of electronic devices connected to the network.

Accordingly, an electronic device located in a space that is different from a space where the voice recognition device 20 is located may also stop outputting sound.

The electronic device according to an embodiment of the disclosure and the control method thereof may selectively control sound outputs from an electronic device located in the same space as the voice recognition device 20 and another electronic device located in a different space from the voice recognition device 20, based on a location of the voice recognition device 20.

In an embodiment of the disclosure given below, for convenience of description, the voice recognition device 20 is assumed to be a speaker capable of recognizing voice commands, and an electronic device for performing control operations according to an embodiment of the disclosure is assumed to be a TV. However, it will be understood that the disclosure is not limited thereto.

Referring to FIG. 2, the electronic device 10 may include a communication device (e.g., including communication circuitry) 11 for performing communications with other electronic devices, a storage device 12 storing data related to operations and controls of the electronic device 10, and a controller (e.g., including processing circuitry) 13 for controlling operations of the electronic device 10, the electronic device may perform communications with the server 100 and may detect the voice recognition device 20 around the electronic device 10.

The electronic device 10 may be connected to the server 100 via a network through the communication device 11, and transmit/receive data related to operations and controls of the electronic device 10 to/from the server 100 through the communication device 11. The electronic device 10 may detect the voice recognition device 20 located around the electronic device 10 through the communication device 11.

The communication device 11 may include various communication circuitry including, for example, and without limitation, at least one of a wireless communication module including various wireless communication circuitry, a short-range communication module including various short-range communication circuitry, or the like, capable of performing communication with the server 100 and other electronic devices to transmit/receive data to/from the server 100 and the other electronic devices.

The wireless communication module may include various wireless communication circuitry included in at least one of various wireless communication modules that may be connected to an Internet network, through a wireless communication method, such as, for example, and without limitation, Wireless-Fidelity (Wi-Fi), Wireless broadband (Wibro), Global System for Mobile Communication (GSM), Code Division Multiple Access (CDMA), Wideband Code Division Multiple Access (WCDMA), Universal Mobile Telecommunications System (UMTS), Time Division Multiple Access (TDMA), Long Term Evolution (LTE), 4Generation (4G) mobile communication, 5Generation (5G) mobile communication, etc.

The short-range communication module may include various short-range communication circuitry included in at least one of various short-range communication modules, such as, for example, and without limitation, a Bluetooth module, an Infrared Data Association (IrDA) communication module, a Radio Frequency Identification (RFID) communication module, a Wireless Local Access Network (WLAN) communication module, a Near Field Communication (NFC) communication module, a Zigbee communication module, a Bluetooth Low Energy (BLE) communication module, etc.

Although the communication device 11 includes various short-range communication modules, the electronic device 10 according to an embodiment of the disclosure will be described in regard of a non-limiting example case in which the communication device 11 includes a BLE module (e.g., including BLE circuitry) 11*a*. However, it will be understood that the disclosure is not limited thereto.

Because a BLE module operates with low power, its battery level may be not greatly influenced by a Bluetooth function although the Bluetooth function is turned on at all times. Accordingly, when the electronic device 10 is in a turned-on state, the electronic device 10 may transmit/receive data to/from other electronic devices in real time through short-range communication of the BLE module 11*a*, and detect other electronic devices located within a predetermined distance from the electronic device 10.

The storage device 12 may store identification information of the voice recognition device 20 detected by the communication device 11. The storage device 12 may store various data related to controls of the electronic device 10.

The storage device 12 may be implemented, for example, and without limitation, as at least one of a non-volatile memory device (for example, a cache, Read Only Memory (ROM), Programmable ROM (PROM), Erasable Programmable ROM (EPROM), Electrically Erasable Programmable ROM (EEPROM), and flash memory), a volatile memory device (for example, Random Access Memory (RAM)), or a storage medium, such as Hard Disk Drive (HDD), Compact Disc Read Only Memory (CD-ROM), although not limited thereto. The storage device 12 may be a memory implemented as a separate chip from a processor described above in regard of the controller 13, or the storage device 12 and the processor may be integrated into a single chip.

When the communication device 11 receives identification information of the voice recognition device 20 that has received a voice command from a user from the server 100, the controller 13 may compare the received identification information with identification information stored in the storage device 12. When the controller 13 determines that the received identification information is identical to the stored identification information, the controller 13 may control the electronic device 10 to stop outputting sound.

A method for controlling the electronic device 10 based on a control flow of the controller 13 and a control of the controller 13 will be described in greater detail below with reference to FIGS. 3 to 10, below.

Figure 3:
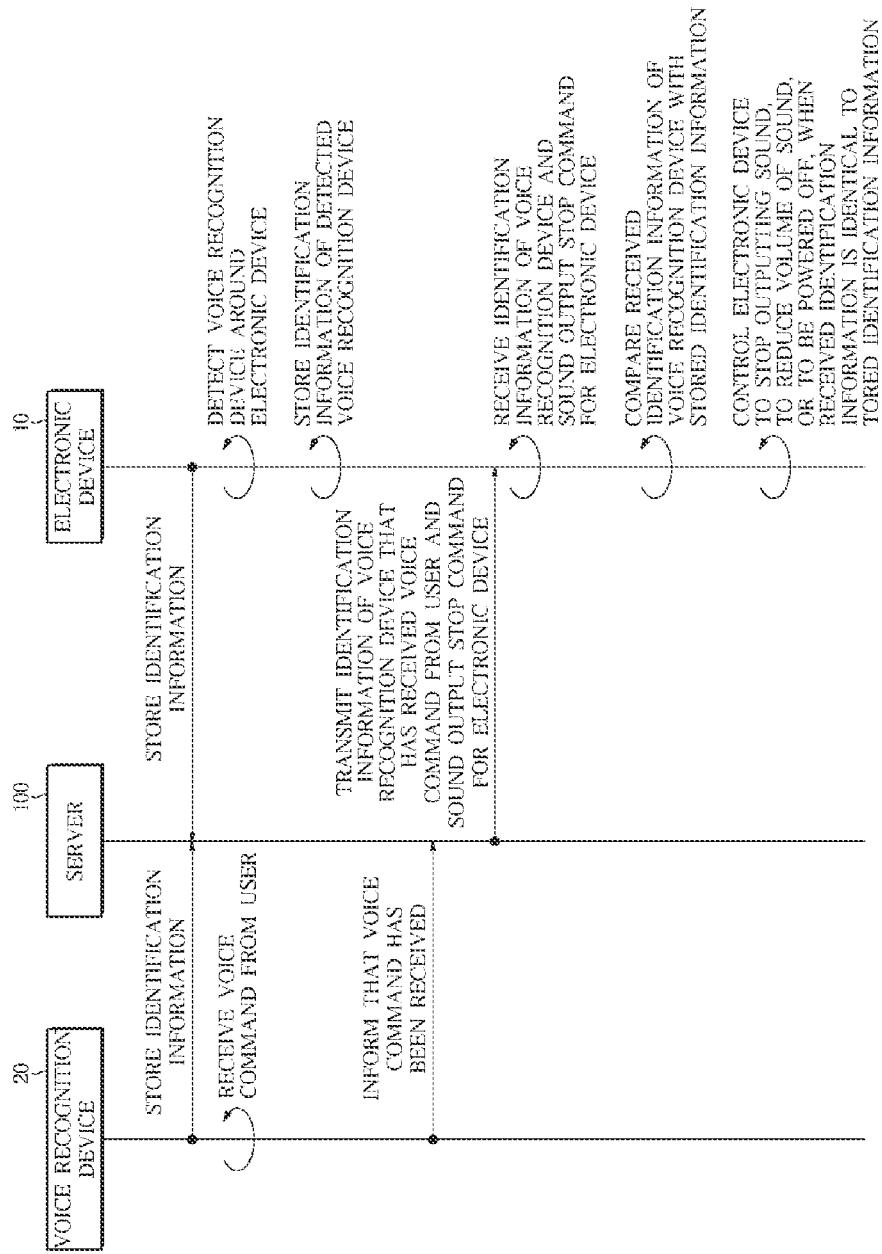
FIG. 3 is a control flowchart illustrating example operations of an example electronic device according to an embodiment of the disclosure.
Figure 4:
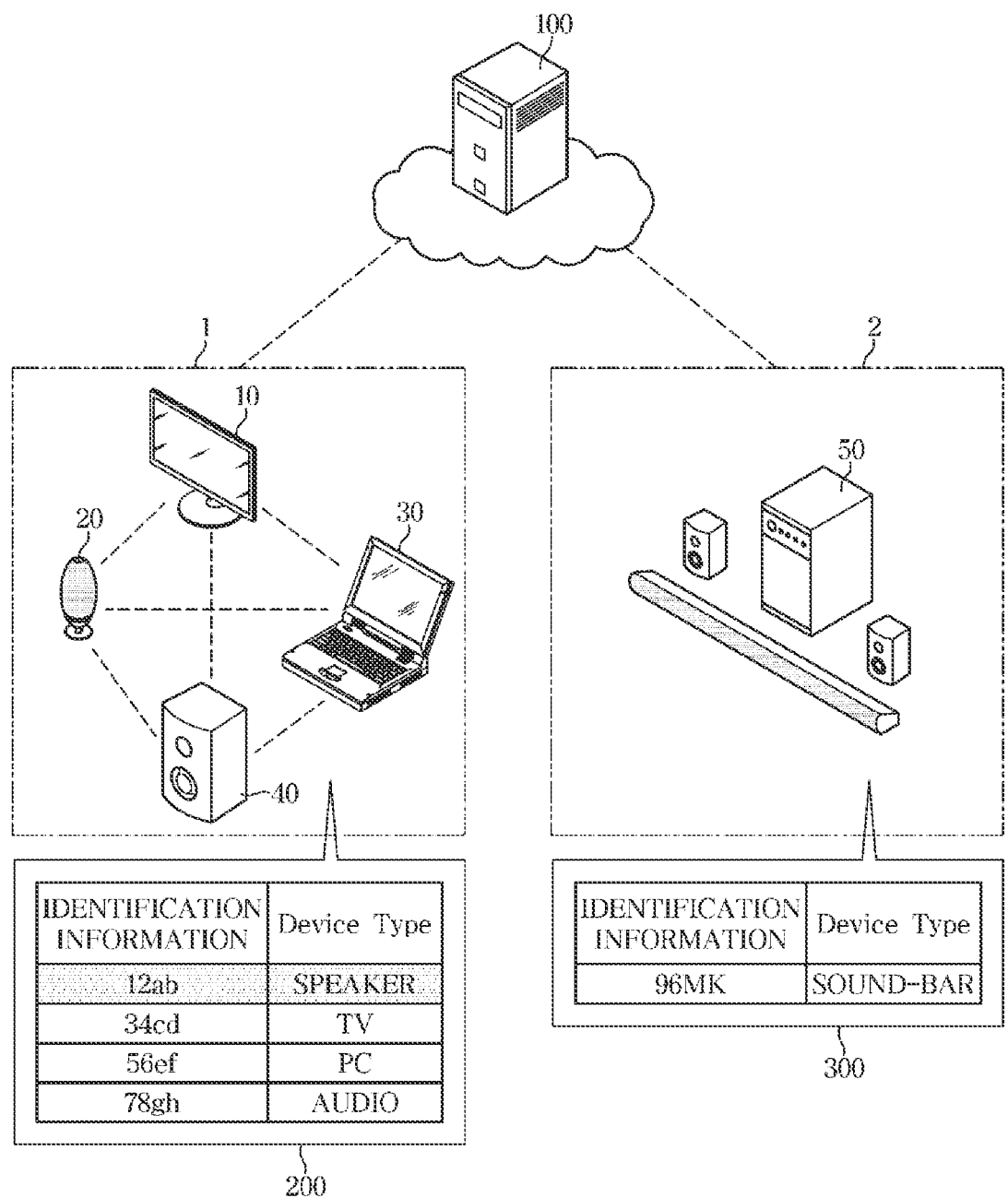
FIG. 4 is a diagram illustrating an example method of detecting devices around an electronic device to store identification information, according to an embodiment of the disclosure.
Figure 5:
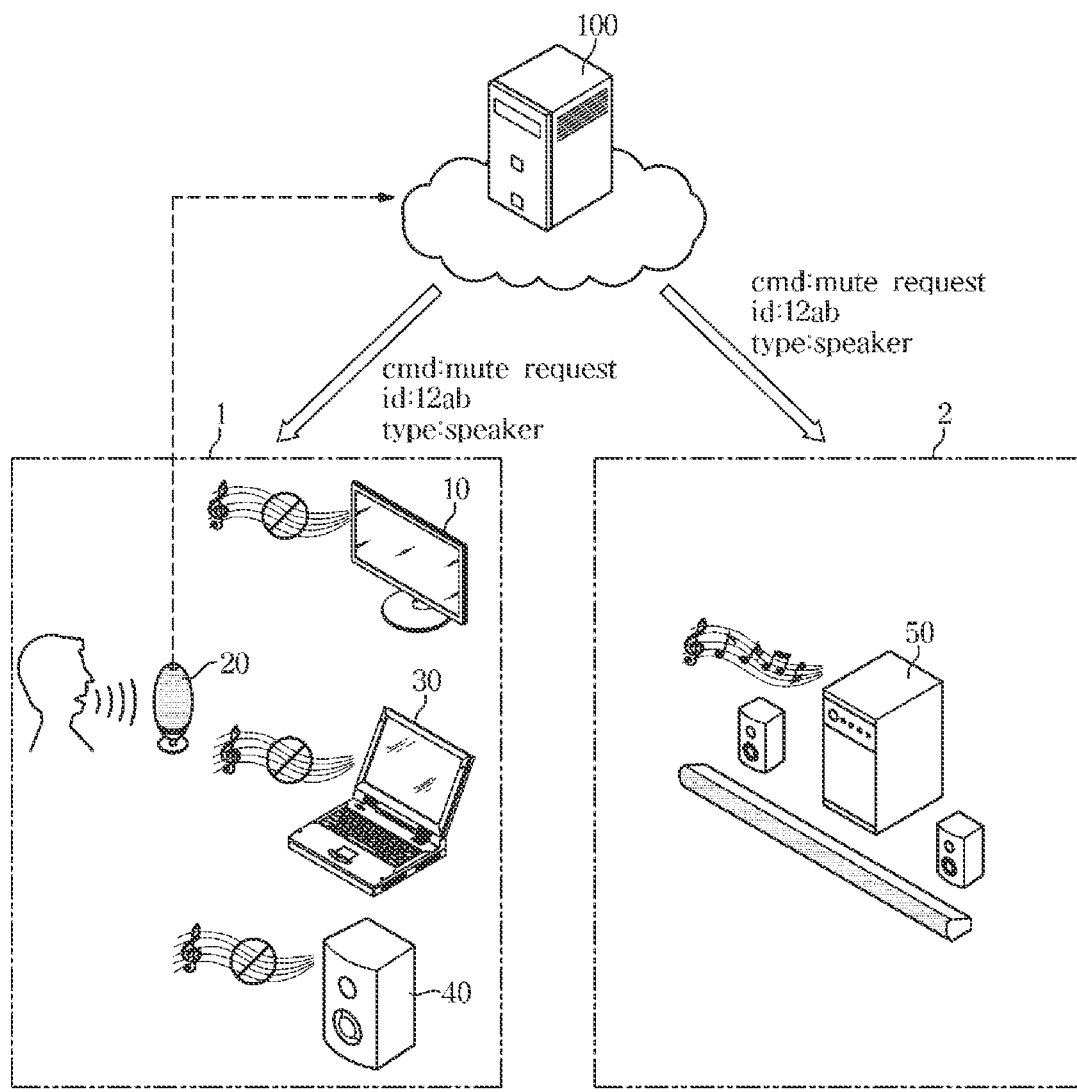
FIG. 5 is a diagram illustrating an example method of limiting sound that is output from an electronic device located in the same space as a voice recognition device, according to an embodiment of the disclosure.
Figure 6:
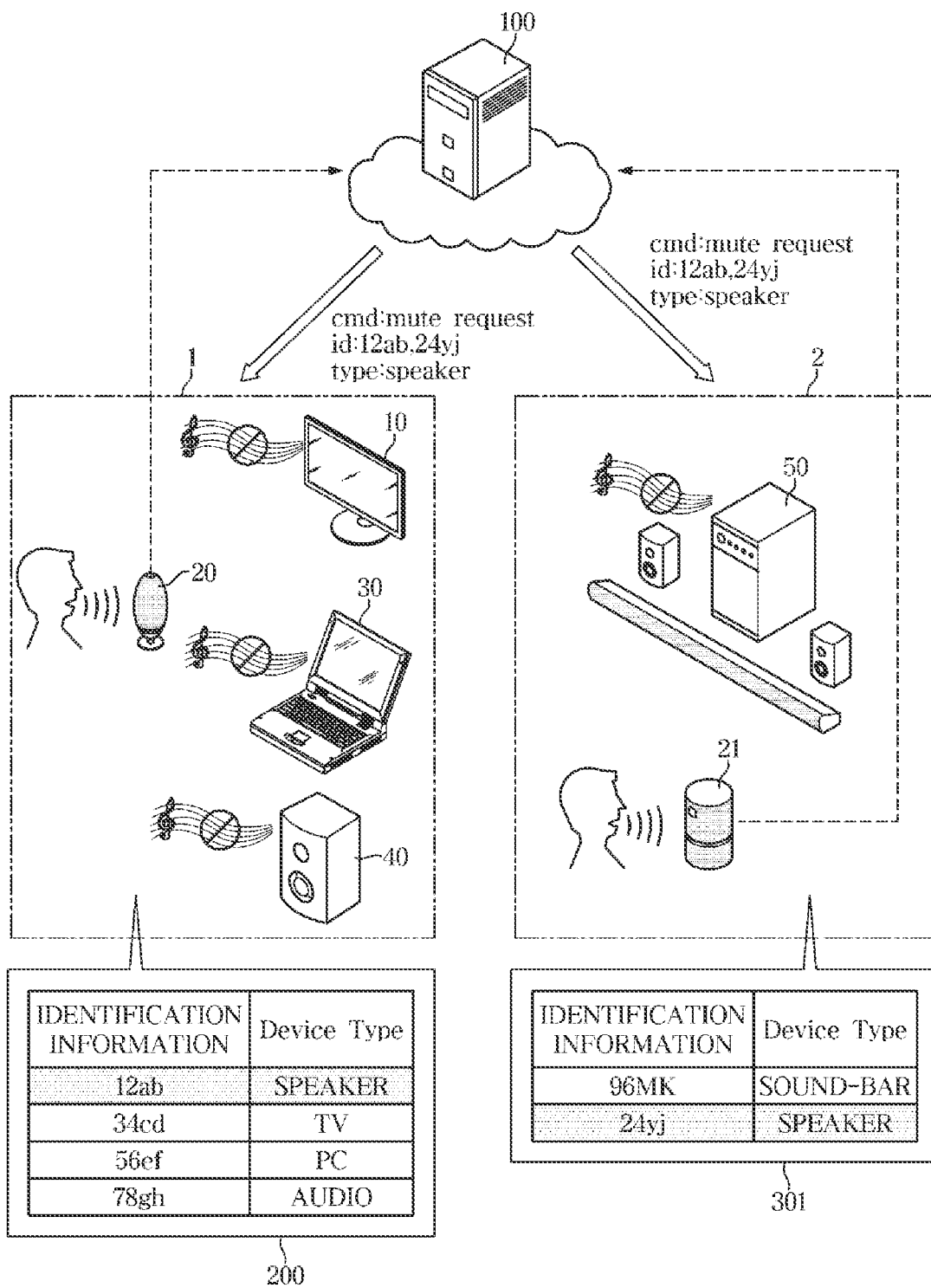
FIG. 6 is a diagram illustrating an example method of limiting sound that is output from an electronic device located in the same space as a voice recognition device, according to another embodiment of the disclosure.
Figure 7:
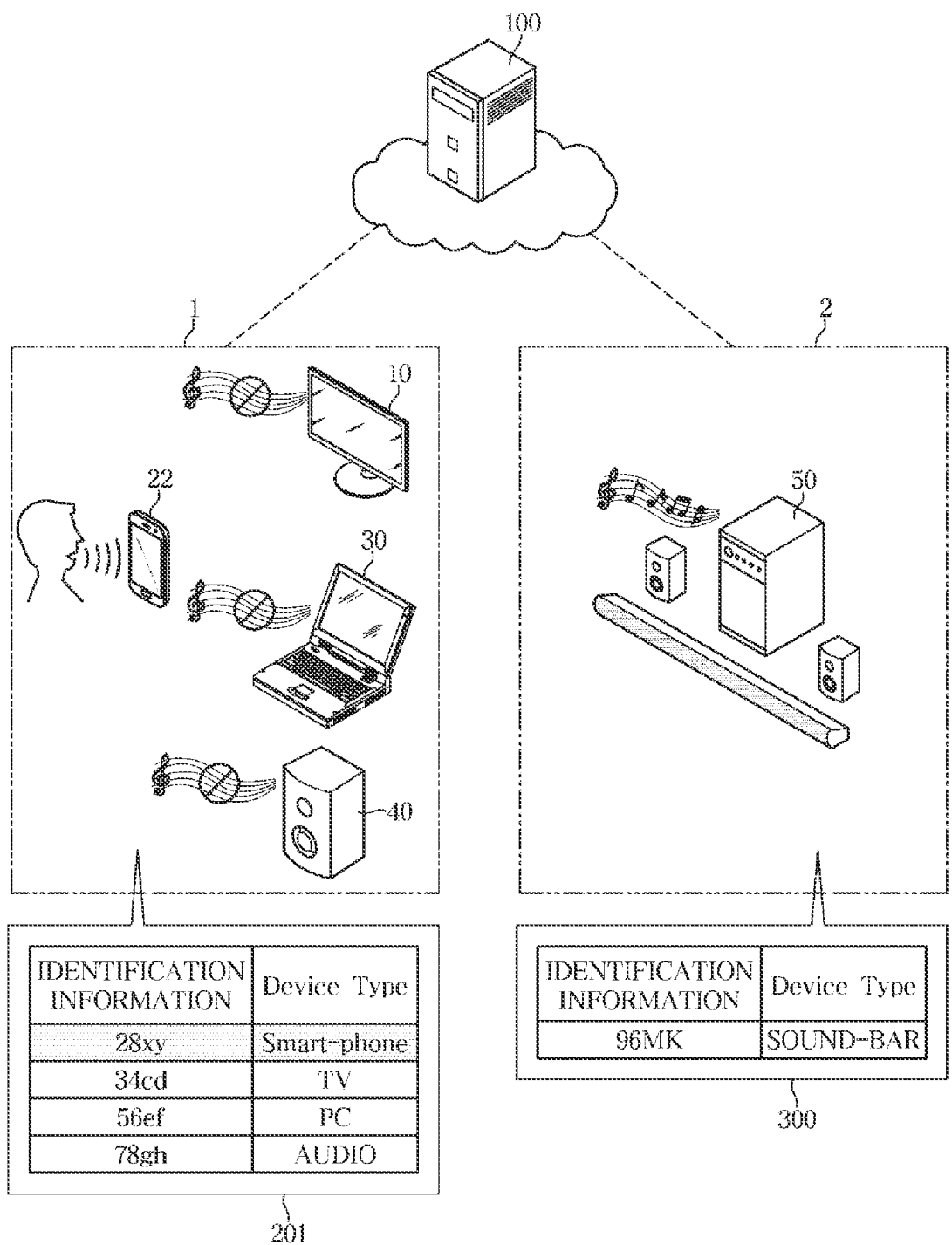
FIGS. 7 and 8 are diagrams illustrating an example method of limiting sound that is output from an electronic device when a location of a voice recognition device changes, according to an embodiment of the disclosure.
Figure 8:
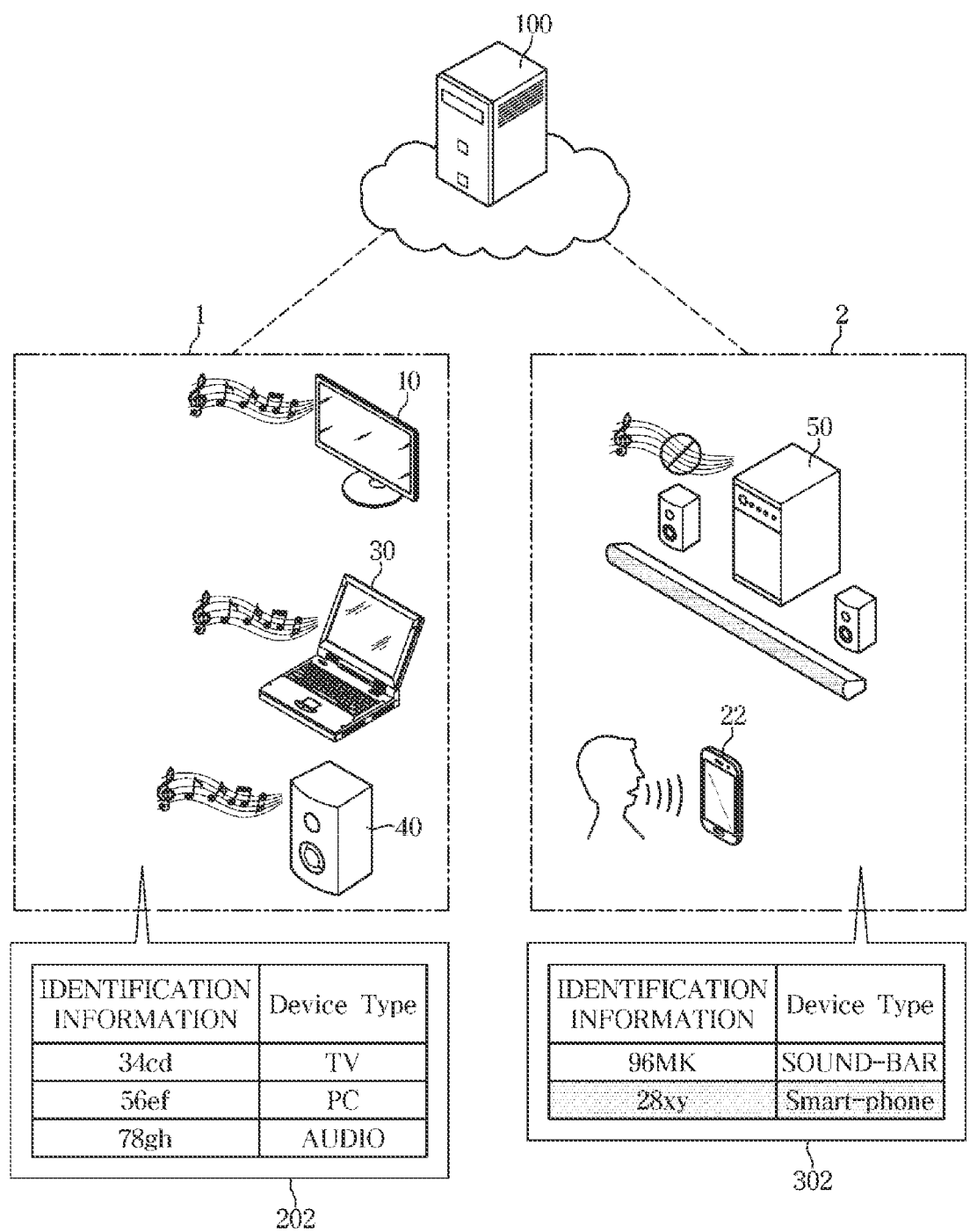

FIG. 3 is a control flowchart illustrating example operations of an example electronic device according to an embodiment of the disclosure. FIG. 4 is a diagram illustrating an example method of detecting devices around an electronic device to store identification information, according to an embodiment of the disclosure. FIG. 5 is diagram illustrating an example method of limiting sound that is output from an electronic device located in the same space as a voice recognition device, according to an embodiment of the disclosure. FIG. 6 is diagram illustrating an example method of limiting sound that is output from an electronic device located in the same space as a voice recognition device, according to another embodiment of the disclosure. FIGS. 7 and 8 are diagrams illustrating an example method of limiting sound that is output from an electronic device when a location of a voice recognition device changes, according to an embodiment of the disclosure.

Referring to FIG. 3, identification information of the voice recognition device 20 and a plurality of electronic devices 10 and information related to operations of the voice recognition device 20 and the electronic devices 10 may have been stored in the server 100 connected to the voice recognition device 20 and the electronic devices 10 through a network.

For example, when the voice recognition device 20 and the electronic devices 10 are connected to the server 100 through the network, the voice recognition device 20 and the electronic devices 10 may transmit their identification information to the server 100.

The identification information may, for example, and without limitation, be represented as production numbers, serial numbers, etc. of the voice recognition device 20 and the electronic device 10, may be data codes arbitrarily set by the server 100, etc. The identification information may include Media Access Control (MAC) addresses assigned to the network when the voice recognition device 20 and the electronic device 10 access the server 100.

The electronic device 10 may detect the voice recognition device 20 around the electronic device 10 through the communication device 11. As used herein, the term "around" may refer, for example, to being within a specified, given or predetermined distance or distance range of.

Referring to FIG. 4, the electronic device 10 located in the first region 1 may detect the voice recognition device 20 and other electronic devices 30 and 40 located within a predetermined distance from the electronic device 10, through short-range communication of the BLE module 11a included in the communication device 11.

Another electronic device (for example, the sound bar 50) located in the second region 2 may detect a voice recognition device and other electronic devices located within a predetermined distance from the other electronic device.

The storage device 12 of the electronic device 10 may store identification information 200 of the electronic device 10, the detected voice recognition device 20 and the detected other electronic devices 30 and 40.

As shown in FIG. 4, each of the voice recognition device 20 and the plurality of electronic devices 10, 30, and 40 located in the first region 1 may store identification information.

For example, identification information of the voice recognition device 20 implemented as a speaker may be detected as '12ab', identification information of the TV 10 may be detected as '34cd', identification information of the PC 30 may be detected as '56ef', and identification information of the audio system 40 may be detected as '78gh'.

The electronic device 10 may store the detected identification information in the storage device 12, and the detected identification information may include, for example, '12ab' which is the identification information of the voice recognition device 20 located in the first region 1.

The identification information of the voice recognition device 20 and the electronic devices 10, 30, and 40 located in the first region 1 may also be stored in the computer 30 and the audio system 40.

The electronic device 50 located in the second region 2 may also store its own identification information 300 detected in the second region 2.

The electronic device 10 located in the first region 1 may detect the voice recognition device 20 and the other electronic devices 30 and 40 located within the predetermined distance, through the BLE module 11a included in the communication device 11.

When the voice recognition device 20 receives a voice command from a user, the electronic device 10 may transmit the identification information of the voice recognition device 20 and the other electronic devices 30 and 40 detected in real time to the server 100. Also, when the voice recognition device 20 receives a voice command from a user, the voice recognition device 20 may transmit the identification information of the voice recognition device 20 and the other electronic devices 30 and 40 detected in real time to the other electronic devices 30 and 40 around the voice recognition device 20 through short-range communication.

For example, when the voice recognition device 20 receives a voice command from a user, the voice recognition device 20 may inform the server 100 that the voice command has been input from the user.

The server 100 may inform the electronic device 10 that the voice command has been received from the user, and the electronic device 10 may transmit the identification information of the voice recognition device 20 and the other electronic devices 30 and 40 detected in real time to the server 100 or the other electronic devices 30 and 40.

Likewise, when another voice recognition device 21 is located in the second region 2 as illustrated, for example, in FIG. 6, the electronic device 50 located in the second region 2 may detect the voice recognition device 21 located around the electronic device 50 in real time.

When the voice recognition device 21 receives a voice command from a user, the electronic device 50 may transmit identification information of the voice recognition device 21 detected in real time to the server 100 or directly to the voice recognition device 21.

According to another embodiment of the disclosure, the voice recognition device 20 may detect identification information of the other electronic devices 10, 30, and 40 located in the same space, in real time. For example, as shown in FIG. 4, the voice recognition device 20 may detect the electronic devices 10, 30, and 40 located in the first region 1 and being adjacent to or within a predetermined distance of the voice recognition device 20, at regular time intervals or in real time, through a BLE module or another short-range communication, and store identification information of the electronic devices 10, 30 and 40 in a memory.

In this example, the voice recognition device 20 may store the identification information of the electronic devices 10, 30, and 40, and the electronic device 10 may not store the identification information of the voice recognition device 20 or the other electronic devices 30 and 40.

Likewise, as shown in FIG. 6, when the voice recognition device 21 is located in the second region 2, the voice recognition device 21 may detect the electronic device 50 located in the second region 2 through short-range communication and store identification information of the electronic device 50.

The voice recognition device 20 may transmit an identification information list for electronic devices to the server 100 or directly to the electronic devices.

Meanwhile, referring to FIG. 6, the voice recognition device 21 may be located in the second region 2.

When the voice recognition device 21 is located in the second region 2, the electronic device 50 located in the second region 2 may detect the voice recognition device 21 located around the electronic device 50, and store identification information 31 including information about the voice recognition device 21 detected in the second region 2 as a detected result.

For example, the plurality of electronic devices 10, 30, 40 and 50 implemented as multimedia reproducing devices that output sound may store the identification information of the voice recognition devices 20 and 21 located around the electronic devices 10, 30, 40 and 50 to limit output sound when a voice command is input to the voice recognition devices 20 and 21.

Referring to FIGS. 3 and 5, when the voice recognition device 20 receives a voice command from a user, the voice recognition device 20 may inform the server 100 that the voice command has been input from the user.

The server 100 may transmit the identification information of the voice recognition device 20 to which the voice command has been input from the user and sound output stop commands for the electronic devices 10, 30, 40 and 50 to the electronic devices 10, 30, 40 and 50.

For example, as shown in FIG. 5, when a user inputs a voice command through the voice recognition device 20 implemented as a speaker, the server 100 may transmit '12ab' corresponding to the identification information of the voice recognition device 20, information about a type of the voice recognition device 20, and sound output stop commands for the electronic devices 10, 30, 40, and 50 to the electronic devices 10, 30, 40 and 50 located in the first region 1 and the second region 2.

When the communication device 11 receives the identification information of the voice recognition device 20 that has received the voice command from the user and the sound output stop commands for the electronic devices 10, 30, 40 and 50 from the server 100, the controller 13 of the electronic device 10 may compare the received identification information with the identification information 200 stored in the storage device 12.

When the controller 13 determines that the identification information received from the server 100 is identical to the identification information 200 stored in the storage device 12, the controller 13 may control the electronic device 10 to stop outputting sound. Meanwhile, when the controller 13 determines that the identification information received from the server 100 is not identical to the identification information 200 stored in the storage device 12, the controller 13 may control the electronic device 10 to keep outputting sound so that a current sound output state of the electronic device 10 may be maintained.

Also, when the voice recognition device 20 informs the server 100 that a voice command has been input from a user, the server 100 may transmit the identification information of the voice recognition device 20 received directly from the electronic device 10 and an identification information list for the other electronic devices 30 and 40 located around the electronic device 10 to the plurality of electronic devices 10, 30, 40 and 50 through an Associated Press (AP). At the same time, the server 100 may transmit sound output stop commands to the plurality of electronic devices 10, 30, 40 and 50.

When an identification information list including the identification information of the voice recognition device 20 and the identification information of the plurality of electronic devices 10, 30, 40 and 50 is received from the server 100, the controller 13 of the electronic device 10 may compare the identification information included in the received identification information list with the identification information 200 stored in the storage device 12.

The controller 13 may determine whether both the identification information of the voice recognition device 20 and the identification information of the electronic device 10 including the controller 13 are included in the identification information list received from the server 100.

When the controller 13 determines that both the identification information of the voice recognition device 20 and the identification information of the electronic device 10 are included in the identification information list received from the server 100, the controller 13 of the electronic device 10 may control the electronic device 10 to stop outputting sound.

When the controller 13 determines that the identification information of the voice recognition device 20 and the identification information of the electronic device 10 are not included together in the identification information list received from the server 100, the controller 13 of the electronic device 10 may control the electronic device to keep outputting sound so that a current sound output state of the electronic device 10 may be maintained.

For example, the electronic device 10 may determine whether the voice recognition device 20 and the electronic device 10 are located in the same region, based on the identification information of the voice recognition device 20 and the identification information of the electronic device 10 included in the identification information list received from the server 100, and the controller 12 may control the electronic device 10 to stop outputting sound based on a determined result.

As shown in FIG. 5, because the voice recognition device 20 is located in the first region 1, not in the second region 2, the electronic devices 10, 30 and 40 located in the first region 1 may have stored identification information of the voice recognition device 20 detected as described above with reference to FIG. 4.

Accordingly, when the electronic device 10 located in the first region 1 receives the identification information of the voice recognition device 20 that has received a voice command from a user and a sound output strop command, the electronic device 10 may stop outputting sound according to a control of the controller 13 because the identification information 200 stored in the electronic device 10 includes '12ab' which is identification information received from the server 100.

The electronic device 10 located in the first region 1 may reduce a volume of sound being output to a predetermined volume according to a control setting value set in advance by a user or according to a type of the electronic device 10, or the electronic device 10 may be powered off.

The other electronic devices 30 and 40 located in the first region 1 may also operate in the same way according to a control of the controller 13.

As such, when a user inputs a voice command through the voice recognition device 20 located in the first region 1, the electronic device 10 located in the same space as the voice recognition device 20 may reduce a volume of sound being output or stop outputting sound, thereby improving a voice recognition rate.

Meanwhile, as shown in FIG. 5, because the voice recognition device 20 is not located in the second region 2, the electronic device 50 located in the second region 2 may not have stored '12ab' which is the identification information of the voice recognition device 20, as described above with reference to FIG. 4.

Accordingly, when the electronic device 50 located in the second region 2 receives the identification information of the voice recognition device 20 that has received the voice command from the user and a sound output stop command, the electronic device 50 may keep outputting sound because the identification information 300 stored in the electronic device 50 does not include '12ab' which is the received identification information.

According to another embodiment, as shown in FIG. 5, when the voice recognition device 20 is located in the first region 1 and the voice recognition device 20 receives a voice command from a user, the voice recognition device 20 may transmit the stored identification information of the electronic devices 10, 30 and 40 to the server 100 or directly to the electronic devices 10, 30 and 40. That is, the voice recognition device 20 may transmit the identification information of the electronic devices 10, 30 and 40 detected in the first region 1 to the server 100 or the electronic devices 10, 30 and 40.

For example, in some cases, when the voice recognition device 20 receives a voice command from a user, the voice recognition device 20 may transmit an identification information list for electronic devices around the voice recognition device 20 and voice output stop commands directly to the electronic devices 10, 30 and 40 through short-range communication, not via the server 100.

The voice command received by the voice recognition device 20 from the user may, for example, be a wake up command for the electronic devices 10, 30 and 40.

The server 100 may transmit the identification information of the electronic devices 10, 30 and 40 received from the voice recognition device 20 and the sound output stop commands for the electronic devices 10, 30 and 40 to the electronic devices 10, 30, 40 and 50.

When a user inputs a voice command through the voice recognition device 20, the voice recognition device 20 may transmit an identification information list including '34cd', '56ef', and '78gh' corresponding to the identification information of the electronic devices 10, 30 and 40 located in the first region 1 to the server 100.

The server 100 may transmit the identification information of the electronic devices 10, 30 and 40 received from the voice recognition device 20 and the sound output stop commands for the electronic devices 10, 30 and 40 to the electronic devices 10, 30, 40 and 50.

In this example, the server 100 may transmit the identification information list for the electronic devices 10, 30 and 40 received from the voice recognition device 20 to the electronic devices 10, 30, 40 and 50 located in the first region 1 and the second region 2 through an AP.

The electronic devices 10, 30, 40 and 50 may determine whether their own identification information is included in the identification information received from the server 100.

The identification information generated by the voice recognition device 20 may include the identification information of the electronic devices 10, 30 and 40 located in the first region 1. Therefore, when the server 100 transmits the identification information and the sound output stop commands to the electronic devices 10, 30, 40 and 50 located in the first region 1 and the second region 2, the electronic devices 10, 30, 40 and 50 may be able to determine whether the identification information received from the server 100 is identical to their own identification information.

For example, the controller 13 of the electronic device 10 located in the first region 1 may determine whether the identification information of the electronic device 10 is included in the identification information received from the server 100, and when the controller 13 determines that the identification information of the electronic device 10 is identical to one of the identification information received from the server 100, the controller 13 may control the electronic device 10 to stop outputting sound based on the sound output stop command received from the server 100.

When identification information of the electronic device 50 located in the second region 2 is not included in the identification information received from the server 100, the electronic device 50 may keep outputting sound without stopping outputting the sound.

Likewise, as shown in FIG. 6, there may be an example in which the voice recognition device 21 is located in the second region 2. In this example, when the voice recognition device 21 receives a voice command from a user, the voice recognition device 21 may transmit identification information of the electronic device 50 detected in advance and stored therein to the server 100 or directly to the electronic device 50. For example, the voice recognition device 21 may transmit the identification information of the electronic device 50 detected in the second region 2 to the server 100 or to other electronic devices.

The server 100 may transmit the identification information of the electronic device 50 received from the voice recognition device 21 and sound output stop commands for the electronic devices 10, 30, 40 and 50 to the electronic devices 10, 30, 40 and 50.

For example, when a user inputs a voice command through the voice recognition device 21, the voice recognition device 21 may transmit '96MK' corresponding to the identification information of the electronic device 50 located in the second region 2 to the server 100.

The server 100 may transmit the identification information of the electronic device 50 received from the voice recognition device 21 and sound output stop commands for the electronic devices 10, 30, 40 and 50 to the electronic devices 10, 30, 40 and 50.

In this example, the server 100 may transmit the identification information of the electronic device 50 received from the voice recognition device 21 to the electronic devices 10, 30, 40 and 50 located in the first region 1 and the second region 2 through an AP.

The electronic devices 10, 30, 40 and 50 may determine whether their own identification information is included in the identification information received from the server 100.

The identification information generated by the voice recognition device 21 may include the identification information of the electronic device 50 located in the second region 2. Therefore, when the server 100 transmits the identification information and the sound output stop commands to all of the electronic devices 10, 30, 40 and 50 located in the first region 1 and the second region 2, the electronic devices 10, 30, 40 and 50 may be able to determine whether the identification information received from the server 100 is identical to their own identification information.

A controller of the electronic device 50 located in the second region 2 may determine whether the identification information received from the server 100 includes the identification information of the electronic device 50. When the controller determines that the identification information of the electronic device 50 is identical to one of the identification information received from the server 100, the controller may control the electronic device 50 to stop outputting sound based on the sound output stop command received from the server 100.

The electronic devices 10, 30 and 40 located in the first region 1 may keep outputting sound without stopping outputting the sound, because their own identification information is not included in the identification information received from the server 100.

For example, the electronic device 10 may detect and store the identification information of the voice recognition device 20 located in the same region, and when a user inputs a voice command through the voice recognition device 20, the electronic device 10 may stop outputting sound. However, it may also be possible that the voice recognition device 20 generates an identification information list for the electronic devices 10, 30 and 40 located in the same region and transmits the identification information list to the electronic devices 10, 30 and 40 through the server 100 so that the electronic devices 10, 30 and 40 included in the identification information list may stop outputting sound when a user inputs a voice command through the voice recognition device 20.

As shown in FIG. 6, when the voice recognition device 21 is located in the second region 2, the electronic device 50 located in the second region 2 may detect the voice recognition device 21 located around the electronic device 50, and store identification information 301 including '24yj' which is identification information of the voice recognition device 21 detected in the second region 2, as a detected result.

For example, there may be an example in which the voice recognition device 20 is located in the first region 1 and the voice recognition device 21 is located in the second region 2. In this example, when a user inputs a voice command through the voice recognition devices 20 and 21 implemented as speakers, the server 100 may transmit '12ab' and '24yj' corresponding to the identification information of the voice recognition devices 20 and 21, information about types of the voice recognition devices 20 and 21, and sound output stop commands for the electronic devices 10, 30, 40 and 50 to the electronic devices 10, 30, 40 and 50 located in the first region 1 and the second region 2.

In this example, limiting sound that is output from the electronic devices 10, 30 and 40 located in the first region 1 has been described above with reference to FIG. 5.

Because the voice recognition device 21 is located in the second region 2, the identification information 301 of the voice recognition device 21 acquired through detection may have been stored in the electronic device 50 located in the second region 2, as described above.

Accordingly, when the electronic device 50 located in the second region 2 receives the identification information 301 of the voice recognition device 21 that has received a voice command from a user and a sound output stop command, the electronic device 50 may stop outputting sound because the identification information 301 stored in the electronic device 50 includes '24yj' which is identification information received from the server 100.

The electronic device 50 located in the second region 2 may reduce a volume of sound being output to a predetermined volume according to a control setting value set in advance by a user or according to a type of the electronic device 50, or the electronic device 50 may be powered off.

For example, by limiting sound that is output from an electronic device located in the same space as the voice recognition device 20 receiving a voice command from a user, a voice recognition rate of the voice recognition device 20 may be improved, and sound that is output from another electronic device located in a space that is different from a space where the voice recognition device 20 is located may be maintained.

Referring to FIGS. 7 and 8, a voice recognition device 22 may be implemented as a type that is movable without being fixed at a predetermined space. For example, the voice recognition device 22 may be implemented as a mobile device such, for example, and without limitation, as a smart phone, and a user may input a voice command while moving the voice recognition device 22.

As shown in FIG. 7, when the voice recognition device 22 is located in the first region 1, the electronic devices 10, 30 and 40 located in the first region 1 may be able to detect the voice recognition device 22, and '28xy' which is detected identification information of the voice recognition device 22 may be stored in the electronic devices 10, 30 and 40 located in the first region 1.

Meanwhile, the electronic device 50 located in the second region 2 may be unable to detect the voice recognition device 22, and therefore, '28xy' which is the identification information of the voice recognition device 22 may be not stored in the electronic device 50 located in the second region 2.

As shown in FIG. 8, when the voice recognition device 22 is located in the second region 2, the electronic device 50 located in the second region 2 may be able to detect the voice recognition device 22, and '28xy' which is the detected identification information of the voice recognition device 22 may be stored in the electronic device 50 located in the second region 2.

Meanwhile, the electronic devices 10, 30 and 40 located in the first region 1 may be unable to detect the voice recognition device 22, and therefore, '28xy' which is the identification information of the voice recognition device 22 may be not stored in the electronic devices 10, 30 and 40 located in the first region 1.

When a user inputs a voice command through the voice recognition device 22 in the first region 1, sound that is output from the electronic devices 10, 30 and 40 located in the first region 1 may be limited, and sound that is output from the electronic device 50 located in the second region 2 may be not limited.

Meanwhile, when a user inputs a voice command through the voice recognition device 22 in the second region 2, sound that is output from the electronic device 50 located in the second region 2 may be limited, and sound that is output from the electronic devices 10, 30 and 40 located in the first region 1 may be not limited.

A method of limiting sound that is output from an electronic device has been described above with reference to FIGS. 5 and 6, and therefore, redundant descriptions may not be repeated here.

As such, even when a location of the voice recognition device 22 changes, sound that is output from an electronic device located in the same space as the voice recognition device 22 may be limited.

Figure 9:
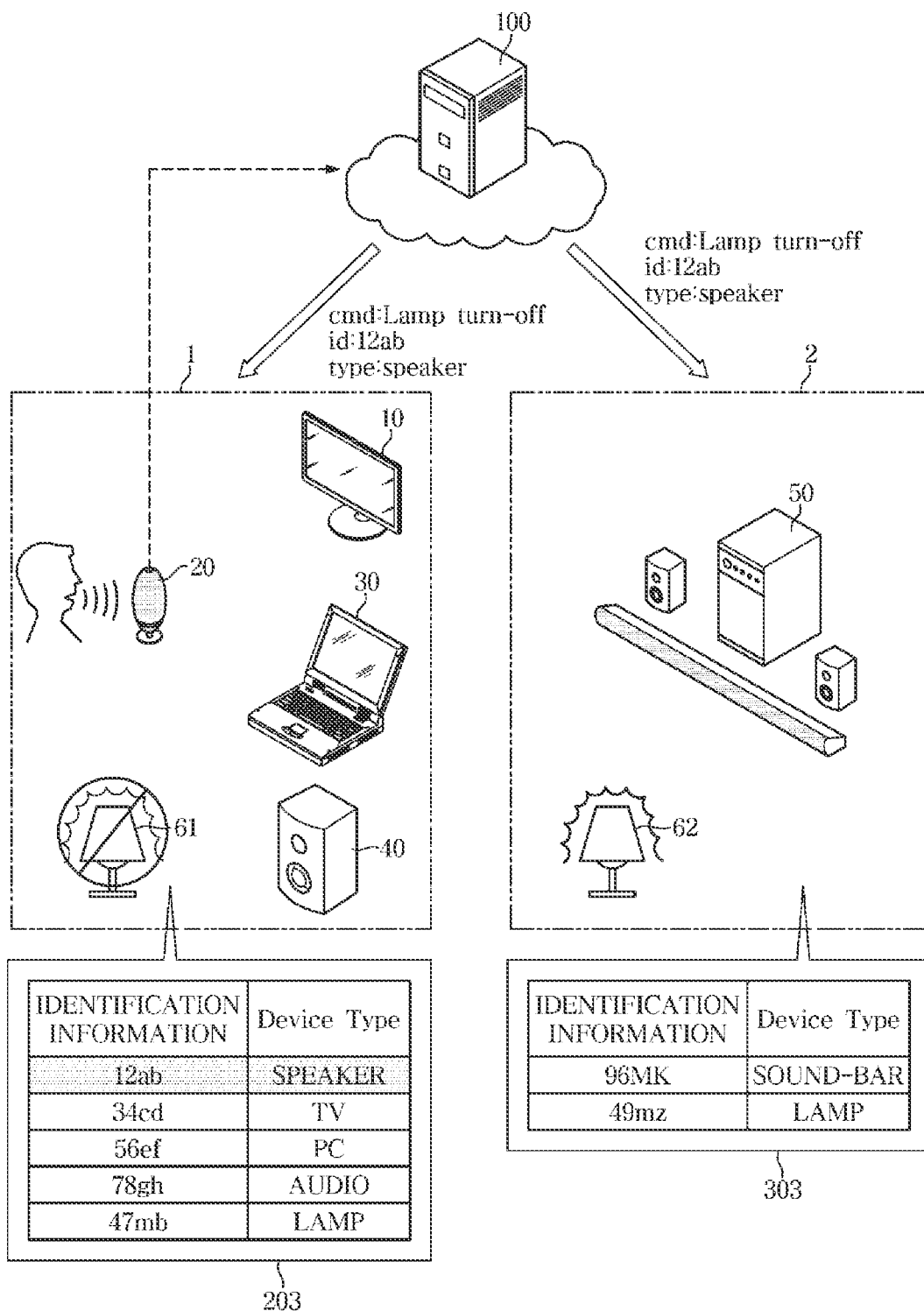
FIG. 9 is a diagram illustrating an example method of limiting illumination that is output from a lamp located in the same space as a voice recognition device, according to an embodiment of the disclosure.

FIG. 9 is a diagram illustrating an example method of limiting illumination that is output from a lamp located in the same space as a voice recognition device, according to an embodiment of the disclosure.

Electronic devices according to an embodiment disclosed in FIG. 9 are assumed, for convenience, to be lamps 61 and 62. However, it will be understood that the disclosure is not limited thereto.

Referring to FIG. 9, the lamp 61 located in the first region 1 may be able to detect the electronic devices 10, 30 and 40 and the voice recognition device 20 located in the first region 1, and store identification information 203 of the detected electronic devices 10, 30 and 40 and the detected voice recognition device 20.

The lamp 62 located in the second region 2 may be able to detect the electronic device 50 and any voice recognition device located in the second region 2, and store identification information 303 of the detected electronic device 50.

The identification information 203 stored in the lamp 61 located in the first region 1 may include '12ab' which is the identification information of the voice recognition device 20. Meanwhile, the identification information 303 stored in the lamp 62 located in the second region 2 may not include '12ab' which is the identification information of the voice recognition device 20.

When the voice recognition device 20 located in the first region 1 receives a voice command from a user, the voice recognition device 20 may inform the server 100 that the voice command has been input from the user.

The user may input a command for turning off the lamps 61 and 62 through the voice recognition device 20, and the server 100 may transmit the command for turning off the lamps 61 and 62 to the lamps 61 and 62 located in the first region 1 and the second region 2, based on identification information of the voice recognition device 20 that has received the voice command from the user and content of the voice command input by the user.

For example, as shown in FIG. 9, when the user inputs a command for turning off the lamps 61 and 62 through the voice recognition device 20 implemented as a speaker, the server 100 may transmit '12ab' corresponding to the identification information of the voice recognition device 20, information about a type of the voice recognition device 20, and the command for turning off the lamps 61 and 62 to the lamps 61 and 62 located in the first region 1 and the second region 2.

The lamps 61 and 62 may compare the identification information of the voice recognition device 20 received from the server 100 with the pre-stored identification information 203 and 303.

When each of the lamps 61 and 62 determines that the identification information of the voice recognition device 20 received from the server 100 is included in the pre-stored identification information 203 and 303, each of the lamps 61 and 62 may be turned off. When each of the lamps 61 and 62 determines that the identification information of the voice recognition device 20 received from the server 100 is not included in the pre-stored identification information 203 and 303, each of the lamps 61 and 62 may be maintained in a turned-on state.

Because the voice recognition device 20 is located in the first region 1, not in the second region 2, the lamp 61 located in the first region 1 may have stored the identification information of the voice recognition device 20, and the lamp 62 located in the second region 2 may not have stored the identification information of the voice recognition device 20.

Accordingly, when the lamp 61 located in the first region 1 receives the identification information of the voice recognition device 20 that has received the voice command from the user and a turn-off command, the lamp 61 may be turned off because the identification information 203 stored in the lamp 61 includes '12ab' which is the identification information received from the server 100.

When the lamp 62 located in the second region 2 receives the identification information of the voice recognition device 20 that has received the voice command from the user and a turn-off command, the lamp 62 may be maintained in a turned-on state because the identification information 303 stored in the lamp 62 does not include '12ab' which is the identification information received from the server 100.

For example, according to an embodiment of the disclosure, when a user inputs a command for turning off the lamps 61 and 62 through the voice recognition device 20, the lamp 61 located in the same space as the voice recognition device 20 may be turned off, and the lamp 62 located in a different space from the voice recognition device 20 may be maintained in a turned-on state, thereby thoroughly reflecting an intention of the user who has input the voice command.

FIG. 10 is a flowchart illustrating an example method of controlling an electronic device according to an embodiment of the disclosure.

Referring to FIG. 10, the electronic device 10 may detect the voice recognition device 20 around the electronic device 10 through the communication device 11, in operation 1000, and the storage device 12 may store identification information 200 of the detected voice recognition device 20, in operation 1100.

When the voice recognition device 20 receives a voice command from a user, the voice recognition device 20 may inform the server 100 that the voice command has been input from the user.

The server 100 may transmit identification information of the voice recognition device 20 to which the voice command has been input from the user and sound output stop commands for a plurality of electronic devices to the electronic devices.

The communication device 11 of the electronic device 10 may receive the identification information of the voice recognition device 20 that has received the voice command from the user and the sound output stop commands for electronic devices from the server 100, in operation 1200. The controller 13 may compare the received identification information with the identification information 200 stored in the storage device 12, in operation 1300.

When the controller 13 determines that the identification information received from the server 100 is identical to the identification information 200 stored in the storage device 12, the controller 13 may control the electronic device 10 to stop outputting sound, to reduce a volume of sound being output, or to be powered off, in operation 1400.

Meanwhile, when the controller 13 determines that the identification information received from the server 100 is not identical to the identification information 200 stored in the storage device 12, the controller 13 may control the electronic device 10 to keep outputting sound without stopping outputting the sound.

As such, the electronic device according to an embodiment of the disclosure, the control method thereof, and the sound output control system of the electronic device may limit sound that is output from an electronic device located in the same space as the voice recognition device 20 that receives a voice command from a user, thereby improving a voice recognition rate of the voice recognition device 20 while maintaining sound that is output from another electronic device located in a space that is different from the space where the voice recognition device 20 is located.

Meanwhile, the disclosed embodiments may be implemented and applied by an AI system based on a machine learning algorithm.

The AI system may refer, for example, to a computer system for implementing human-level intelligence, in which a machine itself learns, judges, and obtains a higher recognition rate the more it is used.

AI technology may include, for example, machine learning (deep learning) technology and element technology based on a machine learning algorithm.

The machine learning technology may use an algorithm that itself classifies/learns the characteristics of input data. The element technology may use a machine learning algorithm to imitate a human brain's functions such as recognition and determination.

Element technologies may include, for example, and without limitation, at least one of linguistic comprehension for recognizing human languages/characters, visual comprehension for recognizing objects as done in human vision, inference/prediction for determining information to logically infer and predict it, knowledge representation for processing a human's experience information as knowledge data, motion control for controlling autonomous driving of vehicles, motions of robots, etc.

The linguistic comprehension may refer, for example, to technology for recognizing and applying/processing human languages/characters, and includes natural language processing, machine translation, a dialogue system, query response, voice recognition/synthesis, etc.

The visual comprehension may refer, for example, to technology for recognizing and processing objects as done in human vision, and includes object recognition, object tracking, image detect, human recognition, scene understanding, spatial understanding, and image enhancement.

The inference/prediction may refer, for example, to technology for judging and logically inferring and predicting information, and includes knowledge/probability-based inference, optimization prediction, preference-based planning, recommendation, etc.

The knowledge representation may refer, for example, to technology for automating human experience information as knowledge data, and includes knowledge construction (data creation/classification), knowledge management (use of data), etc.

The motion control may refer, for example, to technology for controlling autonomous driving of vehicles, motions of robots, etc., and includes motion control (navigation, collision avoidance, driving), operating control (behavior control), etc.

The electronic device according to an embodiment of the disclosure, the control method thereof, and the sound output control system of the electronic device may be implemented as an AI system described above, and accuracy may increase through application of machine learning to the disclosed embodiments.

Meanwhile, the disclosed embodiments may be implemented in the form of recording medium that stores instructions executable by a computer. The instructions may be stored in the form of program codes, and when executed by the processor, the instructions may generate a program module to perform the operations of the disclosed embodiments. The recording medium may be implemented as computer-readable recording medium.

The computer-readable recording medium includes all types of recording media storing instructions that may be decrypted by a computer. For example, the computer-readable recording medium may, for example and without limitation, include a ROM, a RAM, a magnetic tape, a magnetic disk, flash memory, an optical data storage device, or the like.

By limiting a sound that is output from an electronic device located in the same space as a voice recognition device, a voice recognition rate of the voice recognition device may be improved while maintaining a sound that is output from another electronic device located in a space that is different from a space in which the voice recognition device is located.

While various example embodiments of the disclosure have been illustrated and described, it would be appreciated by those skilled in the art that changes may be made in these embodiments without departing from the principles and spirit of the disclosure, the scope of which may be defined, for example, in the claims and their equivalents.

What is claimed is:

1. An electronic device comprising:
a communicator, comprising circuitry, configured to communicate with a server; and
at least one processor configured to:
control the electronic device to provide a sound,
receive, through the communicator from the server, first identification information corresponding to an external device that received a user voice input while the sound is being provided,
obtain a second identification information corresponding to at least one device detected by the electronic device, and
change a volume of the sound based on the received first identification information being related to the obtained second identification information.

2. The electronic device according to claim 1, wherein the processor is configured to identify whether the received first identification information and the second identification information are related based on receiving the first identification information corresponding to the external device that has received the user voice input and a command corresponding to volume change for the electronic device from the server.

3. The electronic device according to claim 1, wherein, the processor is configured to reduce a volume of the sound being provided from the electronic device to a predetermined volume based on the received first identification information being related to the second identification information.

4. The electronic device according to claim 1, wherein, the processor is configured to control the electronic device to turn off based on the received first identification information being related to the second identification information.

5. The electronic device according to claim 1, wherein, the processor is configured to control the electronic device to continue providing the sound based on the received first identification information being not related to the second identification information.

6. The electronic device according to claim 1, wherein the processor is configured to control the communicator to detect the at least one device located within a predetermined distance from the electronic device using short-range communication.

7. The electronic device according to claim 1, wherein the first identification information corresponding to the external device includes a Media Access Control (MAC) address assigned to a network based on the external device accessing the server.

8. A method of controlling an electronic device, comprising:
controlling the electronic device to provide a sound;
receiving, from a server, first identification information corresponding to an external device that received a user voice input, while the sound is being provided;
obtaining a second identification information corresponding to at least one device detected by the electronic device; and
changing a volume of the sound based on the received first identification information being related to the obtained second identification information.

9. The method according to claim 8, wherein whether the received first identification information and the second identification information are related is determined based on receiving the first identification information corresponding to the external device that has received the user voice input and a command corresponding to volume change for the electronic device from the server.

10. The method according to claim 8, wherein the changing the volume of the sound comprises reducing the volume of the sound being output from the electronic device to a predetermined volume based on the received first identification information being related to the second identification information.

11. The method according to claim 8, wherein the changing the volume of the sound comprises turning off the electronic device based on the received first identification information being related to the second identification information.

12. The method according to claim 8, further comprising, controlling the electronic device to keep providing the sound based on the received first identification information being not related to the second identification information.

13. The method according to claim 8, wherein the detecting the at least one device comprises controlling a communicator to detect the at least one device located within a predetermined distance from the electronic device using short-range communication.

14. A sound output control system, comprising:
a voice recognition device configured to receive a user voice input;
a server configured to store first identification information of the voice recognition device that has received the user voice input; and
an electronic device configured to:
provide a sound,
receive the first identification information corresponding to the voice recognition device from the server, while the sound is being provided,
detect at least one device located near the electronic device,
store second identification information corresponding to the detected at least one device, and
change a volume of the sound based on the received first identification information being related to the second identification information.

15. The sound output control system of claim 14, wherein the electronic device is configured to determine whether the received first identification information and the second identification information are related based on receiving the first identification information corresponding to the voice recognition device that has received the user voice input and a command corresponding to volume change for the electronic device from the server.

16. The sound output control system of claim 14, wherein the electronic device is configured to reduce a volume of the sound being provided to a predetermined volume based on the received first identification information being related to the second identification information.

17. The sound output control system of claim 14, wherein the electronic device is configured to be turned off based on the received first identification information being related to the second identification information.

18. The sound output control system of claim 14, wherein the electronic device is configured to keep providing the sound based on the received first identification information being not related to the second identification information.

19. The sound output control system of claim 14, wherein the electronic device is configured to detect the at least one device located within a predetermined distance from the electronic device using short-range communication.

* * * * *